Dec. 19, 1922.
K. N. SNOEN.
PASTEURIZATION OF MILK.
FILED JUNE 17, 1921.
1,439,027.
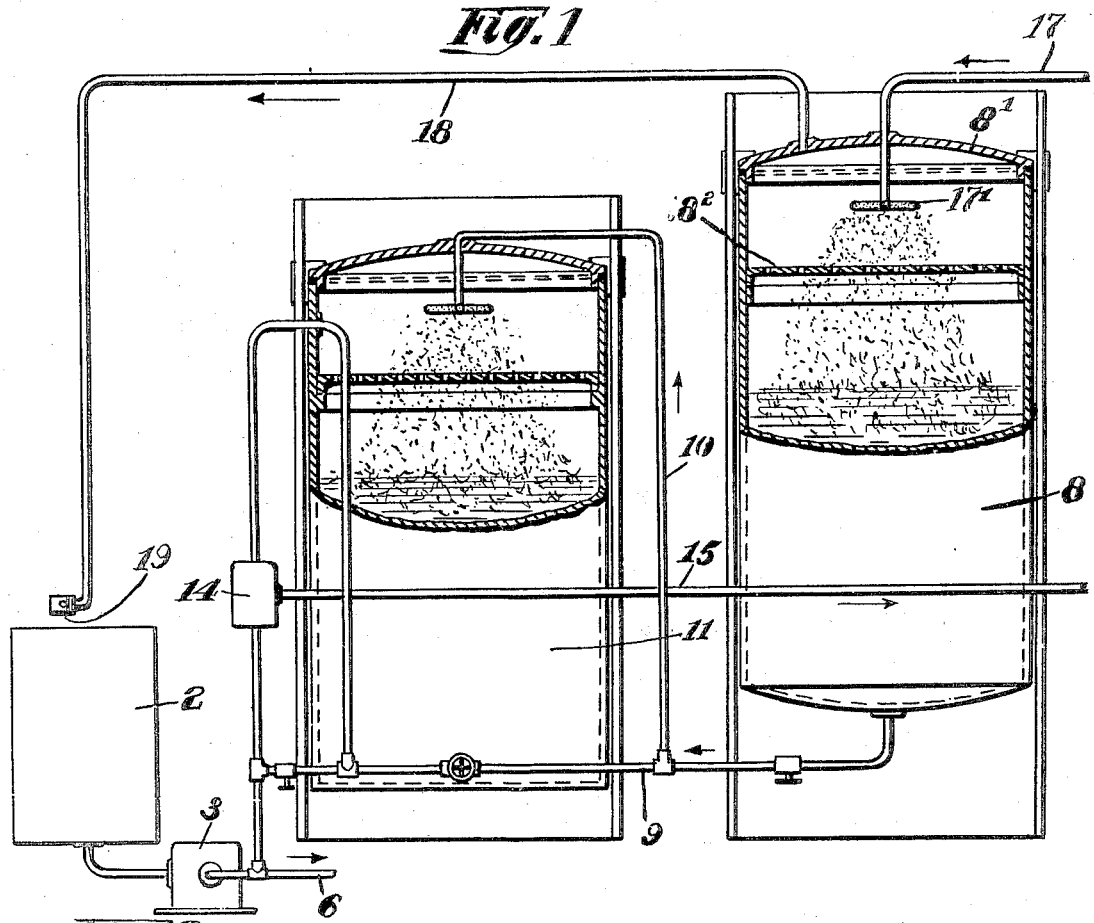
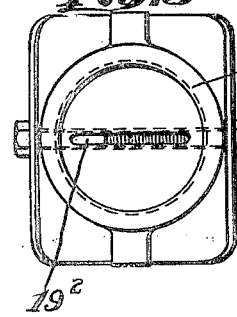
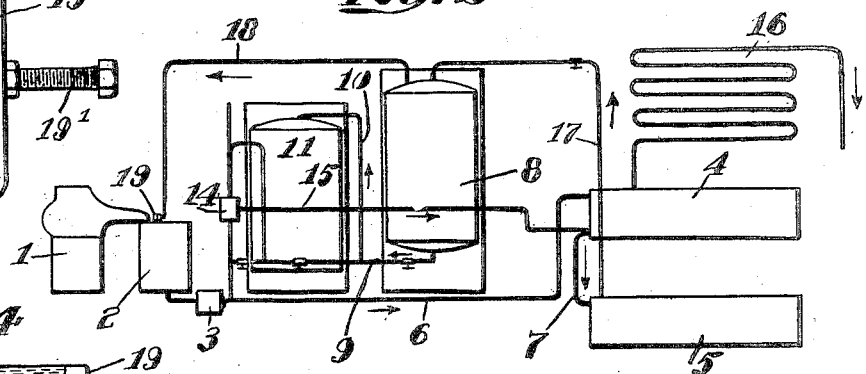
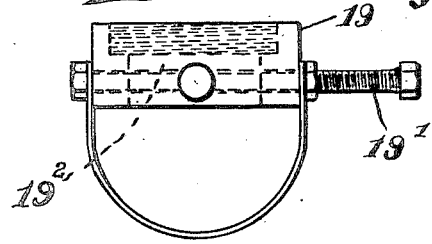
Inventor
Kornelius N. Snoen.
By *Allis Spear Jr.*
Attorney Patented Dec. 19, 1922.

1,439,027

UNITED STATES PATENT OFFICE.

KORNELIUS N. SNOEN, OF EVERETT, MASSACHUSETTS.

PASTEURIZATION OF MILK.

Application filed June 17, 1921. Serial No. 478,413.

*To all whom it may concern:*

Be it known that I, KORNELIUS N. SNOEN, a citizen of the United States, residing at Everett, county of Middlesex, Commonwealth of Massachusetts, have invented certain new and useful Improvements in the Pasteurization of Milk, of which the following is a specification.

This invention relates to the art of pasteurizing milk and particularly to a pasteurizing system and method of operation whereby output is increased and waste avoided.

In pasteurizing milk much difficulty has been experienced in running apparatus without a considerable loss from overflows. The result has been that most apparatus has either been run at less capacity with resultant delays and losses or when being pushed to capacity has made waste which not only represented losses in milk but cause conditions not consistent with the sanitary handling of such a commodity as milk which the very requirement of pasteurization presupposes.

I have observed that the principal retardation in the ordinary pasteurizing system results from the foaming and becomes most critical at the holders. This is due to the rapid discharge of the milk on surfaces from which the milk is supposed to drip. At this point the milk has opportunity and does very readily foam, forming elastic bubbles characteristic of the product which in the aggregate or when accumulating not only obstructs the dripping milk but backs up and if kept tight will form resistance to the circulation in advance to the holders. Such foaming is particularly troublesome where milk is run cold through the clarifier. In some systems effort has been made to reduce this trouble by preheating before clarification but this can only be done at a loss in value due to the decrease in the cream raising capacity of the milk.

In my system I have provided for the expulsion of these foam bubbles in such a way that they are passed off from the immediate presence of the drip plates, are broken and are returned to circulation and thus saved without loss or waste.

In the accompanying drawings I have shown an embodiment of my invention which I have found well adapted to practical use on a large scale. Throughout the specification and drawings like reference characters are employed to indicate corresponding parts, and in the drawings:

Fig. 1 is a partly section view of a holder system in accordance with my invention.

Fig. 2 is a somewhat diagrammatic lay out of such a system,

Fig. 3 is a plan of the bubble breaker of my froth circuit, and

Fig. 4 is a side elevation of the same.

Referring first to the diagrammatic view in Fig. 2, I have indicated at 1 a clarifier, at 2 a clarifier tank, at 3 a circulating pump, which pumps the milk through the pipe 6 to a regenerator 4 at which point the cool milk meets the hot milk pumped from the second tank 11 by the hot milk pump 14 through the pipe 15. The pipe 6 leading from the pump 3 enters the regenerator 4 passes through the pipes 7 to and through the pasteurizer 5 from which it passes through the pipe 17 to the primary holder 8 from which it passes through the pipes 9 and 10 to the secondary holder 11. From the secondary holder 11 it is pumped by the hot milk pump 14 through the pipe 15 to the regenerator 4 where it passes around the cold milk pipes which are supplied through the pipe 6. From the regenerator 4 the milk thus partially cooled goes to the cooler 16 through the pipe 17. From the cooler it is usually lead to tanks (not shown) from which it is bottled or otherwise used.

The holders 8 and 11 are substantially identical in structure and the description of one will therefore suffice. The milk enters the holder 8, is delivered through the pipe 17 to the top of the tank through the cover of the tank $8^1$. This cover is preferably gasketed and clamped and so made air tight. The pipe 17 terminates in a perforated T $17^1$ which delivers the milk on to a perforated plate $8^2$. From this plate the milk drops in a shower into the tank 8.

As the milk leaves the T-shaped nozzle $17^1$ under some pressure it has a decided tendency to foam. This foam accumulates above the plate $8^2$ and tends to create a back pressure in the tank as well as to obstruct the passage of the milk through the perforated plate. If the cover $8^1$ were not gasketed and clamped, this pressure would be sufficient to cause the tank to foam over, thus losing a considerable quantity of milk and creating unsanitary conditions on and around the apparatus.

The foam being essentially in the form of bubbles has been found difficult to handle. I have discovered, however, that by making the tank tight and utilizing the displacement of the air by the inflow of the milk to form a slight pressure, I am able to pass out through a foam remover 18 a constant stream of froth and condensed or condensing foam.

This mixture is of course not in a condition in which it can be immediately utilized to advantage. I therefore provide at the end of the foam remover 18 a bubble breaker 19. As will be seen by reference to Figs. 3 and 4, this bubble breaker 19 is in the form of a cap provided with a narrow slot 19² which may be adjusted as to length by a screw 19¹. By the adjustment of this screw I am able to eliminate substantially all of the bubbles and thus deliver the condensed product into the clarifier tank 2 where it will be mixed with a fresh supply of cold milk and returned through the system, thus being equally distributed through the run. In this way I am able to keep a system running at full capacity without any delays and without any loss.

Various modifications may be made in the details and construction and arrangement of parts, all without departing from the spirit of my invention if within the limits of the appended claims.

What I therefore claim and desire to secure by Letters Patent is:

1. A pasteurizing apparatus including a circulating pump, a pasteurizer and a holder comprising an air tight tank having an intake at its top, and a perforated drip plate beneath said intake, and a foam remover at the top of said tank above the intake and including a bubble breaker whereby the foam is expelled from the holder and recovered.

2. A pasteurizing apparatus including in series a clarifier, a regenerator, a pasteurizer and a holder comprising an air tight tank having an intake at its top, and a perforated drip plate beneath said intake, a pump for circulating milk through the apparatus and an outlet at the top of said tank above the intake and leading to the clarifier.

3. A pasteurizing apparatus including in series a clarifier, a regenerator, a pasteurizer and a holder comprising an air tight tank having an intake at its top, and a perforated drip plate beneath said intake, a pump for circulating milk through the apparatus and an outlet at the top of said tank above the intake and leading to the clarifier and terminating in a bubble breaker whereby the foam is expelled from the holder and the milk returned to circulation.

4. A pasteurizing apparatus including a circulating pump and a holder comprising an air tight tank having an intake at its top, and a perforated drip plate beneath said intake, and a foam remover at the top of said tank above the intake and including a bubble breaker having a slot and means for adjusting the size of the slot.

5. In a milk pasteurizing system, in combination, a holder having a drip plate therein, and a foam remover having an outlet above said drip plate and provided exteriorly of the holder with a bubble breaker whereby the foam bubbles are broken up and recovered as milk.

6. A pasteurizing apparatus, comprising an air tight tank, a pump for delivering thereto the fluid to be pasteurized, a drip plate within said tank onto which the fluid discharges, a foam remover above said drip plate, and a bubble breaker in said foam remover consisting of a cap having a slot and a screw for varying the size of said slot.

In testimony whereof I affix my signature in presence of two witnesses.

KORNELIUS N. SNOEN.

Witnesses:
  VICTORIA LOWDEN,
  MARION F. WEISS.